(12) United States Patent
Jarvis et al.

(10) Patent No.: US 8,048,608 B2
(45) Date of Patent: Nov. 1, 2011

(54) LASER MARKING

(75) Inventors: Anthony Nicholas Jarvis, Widnes (GB); Martin Robert Walker, Widnes (GB)

(73) Assignee: Datalase Ltd., Cheshire (GB)

( * ) Notice: Subject to any disclaimer, the term of this patent is extended or adjusted under 35 U.S.C. 154(b) by 239 days.

(21) Appl. No.: 12/302,840

(22) PCT Filed: Jun. 6, 2007

(86) PCT No.: PCT/GB2007/002080
§ 371 (c)(1),
(2), (4) Date: May 26, 2009

(87) PCT Pub. No.: WO2007/141522
PCT Pub. Date: Dec. 13, 2007

(65) Prior Publication Data
US 2010/0015558 A1   Jan. 21, 2010

(30) Foreign Application Priority Data

Jun. 8, 2006   (GB) .................................. 0611325.2

(51) Int. Cl.
*G03F 7/00* (2006.01)
*G03F 1/00* (2006.01)
*G03F 7/004* (2006.01)
*C03C 1/00* (2006.01)
*C09C 1/62* (2006.01)

(52) U.S. Cl. ........... 430/270.1; 430/7; 430/14; 430/292; 430/301; 430/320; 106/400

(58) Field of Classification Search ............... 430/270.1, 430/7, 14, 292, 301, 320; 106/400
See application file for complete search history.

(56) References Cited

U.S. PATENT DOCUMENTS

| 5,382,311 | A | * | 1/1995 | Ishikawa et al. | ......... 156/345.54 |
| 5,786,129 | A | * | 7/1998 | Ellis | .............................. 430/302 |
| 6,830,822 | B2 | * | 12/2004 | Yadav | ........................... 428/552 |
| 7,485,403 | B2 | * | 2/2009 | Khan | ......................... 430/270.1 |
| 2005/0186511 | A1 | | 8/2005 | Khan | |

FOREIGN PATENT DOCUMENTS

| EP | 600441 A1 | * | 6/1994 |
| EP | 0 829 454 | | 3/1998 |
| WO | WO 02/068205 | | 9/2002 |
| WO | WO 02074548 A2 | * | 9/2002 |
| WO | WO 2004043704 A1 | * | 5/2004 |
| WO | WO 2004/045857 | | 6/2004 |
| WO | WO 2005/068207 | | 7/2005 |
| WO | WO 2007/044106 | | 4/2007 |
| WO | WO 2007/045912 | | 4/2007 |

* cited by examiner

*Primary Examiner* — Amanda C. Walke
(74) *Attorney, Agent, or Firm* — Saliwanchik Lloyd & Eisenschenk

(57) ABSTRACT

An ink formulation comprises a marking component, e.g. ammonium octamolybdate, and a metal salt that absorbs laser irradiation at 780-2500 nm, e.g. reduced indium tin oxide, and thereby causes the marking component to change colour.

25 Claims, No Drawings

LASER MARKING

This application is a National Stage Application of International Application Number PCT/GB2007/002080, filed Jun. 6, 2007; which claims priority to Great Britain Patent Application No. 0611325.2, filed Jun. 8, 2006, all of which are incorporated herein in their entirety.

FIELD OF THE INVENTION

This invention relates to laser marking.

BACKGROUND OF THE INVENTION

WO02/01250 discloses the use of oxymetal salts in laser marking. AOM (ammonium octamolybdate) is an example of a material that can be marked directly with 10,600 nm laser radiation. However, the use of a NIR (near infra-red) laser would offer additional advantages.

WO05/068207 discloses the use of NIR laser radiation (i.e. at 800 to 2000 nm) to initiate a colour change reaction when a NIR-absorbing metal salt is used in combination with a substance that normally undergoes a colour change reaction at much longer wavelength (~10,600 nm), e.g. AOM. A plethora of metal salts are described; particularly preferred salts are of copper, e.g. CHP (copper hydroxy phosphate).

WO05/095516 discloses that r-ITO (reduced indium tin oxide), a non-stoichiometric compound, can be incorporated into thermoplastics which are then heated, using non-laser NIR heating lamps, above their glass transition temperatures for stretch blow-moulding, e.g. in the production of PET beverage bottles from injection-moulded performs. r-ITO is particularly suitable for this purpose as it is mostly transparent in the visible region.

JP8127670 discloses the use of reduced titanium oxide compounds for incorporation into thermoplastics, for the laser marking of moulded products.

U.S. Pat. No. 5,578,120 describes the use of a laser beam-absorbing inorganic substance and a colorant. Examples of the colorants that can be used include those mentioned in JP-A-49-82340, e.g. zinc oxide semiconductors and titanium dioxide semiconductors.

U.S. Pat. No. 5,911,921 discloses the use of non-stoichiometric ytterbium phosphate to produce NIR absorbing inks, e.g. for printing stealth bar codes.

U.S. Pat. No. 6,602,595 discloses the use of non-stoichiometric nano-materials for use in inks. r-ITO is mentioned as an NIR absorber.

SUMMARY OF THE INVENTION

This invention is based on the finding that a non-stoichiometric compound such as r-ITO, e.g. in the form of a nanopowder, can function as a highly effective absorber of near infra-red radiation in the region 900 to 2500 nm, and gives rise to contrasting images when incorporated in, say, an AOM-based ink formulation and subjected to laser radiation in the near infrared region of the electromagnetic spectrum (780 to 2500 nm). At 1066 nm, r-ITO gave stronger images than CHP at lower fluence levels. At 1550 nm, r-ITO gave a contrasting image where CHP gave no image at all.

The present invention is more generally based on the fact that r-ITO is a non-stoichiometric compound. Non-stoichiometric compounds are defined as compounds in which the numbers of atoms of the elements present cannot be expressed as a ratio of integers, as opposed to stoichiometric compounds which can be so expressed. A definition may be found at http://en.wikipedia.org/wiki/Non-stoichiometric_compound. Examples are given in U.S. Pat. No. 6,602,595.

The non-stoichiometric ITO sample used in the experiments on which the invention is based was 'reduced'. Reduction removes oxygen, thus leaving an excess of metal. Without wishing to be limited by theory, this creates a free electron that is free to migrate through the solid lattice. This free electron bestows electrical conductivity properties and, in the case of r-ITO NIR absorption properties.

The invention utilises a metal salt as a functional IR-absorber/colour developer material which, on absorption of radiation from a laser source, can directly produce a colour-forming reaction when in combination with a component that will otherwise undergo the desired reaction on irradiation at a higher wavelength. For example, it can be used in combination with an oxymetal anion component in an applied coating, to generate a distinct coloured image. Alternatively, a colour-forming component is used, to generate a distinct image.

According to this invention, the potential of utilizing fibre, diode, diode array and $CO_2$ lasers for imaging applications on, for example, of packaging can be realized. It has been shown that, by the application of liquid film-forming inks onto various substrates to produce coatings capable of distinct colour change, exposure to near-IR sources produces good results dependent primarily on the formulation of the ink.

DESCRIPTION OF PREFERRED EMBODIMENTS

The IR absorber used in this invention should be compatible with the colour change chemistry, have no or minimal absorption in the visible region of the absorption spectrum, and be an efficient absorber of radiation at a wavelength of 780 to 2500 nm. Preferably, the IR absorber is inorganic in nature. It should have thermally stability at above 200° C. and good light stability and weatherability. It should be colourless or impart minimal colour in the finished coating formulation. Further preferred features of the IR absorber are that it should be water-stable, have minimal solubility in water, be compatible with water-based binders/compatible with common organic solvents, environmentally friendly, readily available and non-toxic.

Preferred inorganic compounds are non-stoichiometric metal oxides and mixed metal oxides. A particularly preferred inorganic, non-stoichiometric mixed metal oxide is reduced-indium tin oxide.

The inorganic compounds used in the present invention can be in the form of particles having a D3,2 average particle size in the range from 10 nm to 10 μm, preferably less than 1 μm, and more preferably less than 100 nm. The particles can comprise a core-shell arrangement with the inner core being composed of the colour change material and the outer shell comprising the NIR-absorbing compound.

The inorganic compounds used in the present invention can also be applied to the substrate containing the marking component via a sputtering process. Sputtering is defined as depositing (metal) by using fast ions etc, to eject particles of it from a target. Sputtering results in the formation of a thin film of inorganic, non-stoichiometric NIR-absorbing compound on the surface of the substrate containing the colour change material. The sputtered film may be between 10 nm and 10 μm, preferably less than 2.5 μm, and more preferably less than 1000 nm in thickness. The colour change material can also be sputtered on to a substrate containing the inorganic, non-stoichiometric compound.

Other than the non-stoichiometric compound, compositions of and for use in the present invention may comprise materials of the type described in the publications identified above (all of which are incorporated herein by reference). In one particular embodiment of the invention, when a polymetal salt is used in combination with an additional marking component, then a composite colour can be achieved. The marking component may be one or more of a range of materials such as, for example, dye precursor, colour developer+dye precursor, oxy metal salt, oxy metal salt+dye precursor, oxy metal complex, or oxy metal complex+dye precursor. Other suitable components include pigment precursors. Any or all such components may be polymeric or halogenated; cellulosic materials or sugars may also be used. Examples of charrable polymers and sugars are polyvinyl alcohol, carboxymethylcellulose, hydroxypropylcellulose, fructose, glucose, sucrose and starch.

All such active materials described above can be supported on inert materials such as alumina, titanium oxide, zinc oxide, kaolin or mica.

A preferred component for use in the invention is a compound including an oxymetal anion. In combination with a salt, this typically allows marking with a fibre, diode, diode array or $CO_2$ laser. A suitable oxymetal anion component may be one or more of a range of materials, for example, ammonium octamolybdate, bis[2-(ethylhexylamine)]molybdate or di(cyclohexylamine)molybdate. A suitable ink formulation comprises 10-50% w/w of this component.

A colour-forming component may be included. Such materials are well known to those of ordinary skill in the art. Examples of suitable colour-formers include one or more of a range of conventional materials such as electron-donating materials, e.g. phthalides, fluorans and leuco dyes, for example crystal violet lactone. Lewis acids, whether electron-accepting or acid-generating, may also be used; examples are hydroxybenzoate, bisphenol A, zinc stearate and others.

Compositions for use in the invention can be produced in solvent, non-solvent and solvent-less binder systems such as Tampoprinting inks, UV-curing inks etc. A suitable binder is a water-soluble, alkali-soluble or an emulsion polymer, examples being polyvinyl alcohol (as available as Gohsenol GH-17), acrylic emulsion (as available from Scott Bader as Texicryl 13-011), materials available as Ineos Elvacite 2013, 2028, 2043 or 30, polyvinyl butyral (available as Pioloform) and nitrocellulose, e.g. in an amount of 10-50% w/w.

Pigments such as fumed silica or zinc stearate may also be used, e.g. in an amount of 10-50% w/w. Other materials that may be used include any one or more of antioxidants, reducing agents, lubricating agents, surfactants, pigments, sensitizers and defoamers.

When formulated as an ink for use in the invention, e.g. as a solution, dispension or suspension, a suitable carrier liquid or solvent may be aqueous or organic, and other components will be chosen accordingly. For example, the liquid may be or comprise water or an organic solvent such as isopropanol, methyl ethyl ketone, ethanol or ethyl acetate, optionally with amine and/or surfactant, e.g. in an amount of 20-80% w/w. Compositions may be prepared by dispersion of components in water-based polymer binder solutions such as polyvinyl alcohol and film-forming emulsions such as acrylics. These compositions may be produced by using:

a) mechanical mixing, e.g. leading edge-trailing blade stirring
 b) ceramic ball grinding and milling
 c) silverson mixing
 d) glass bead mechanical milling, e.g. in an Eiger Torrance motormill
 e) Ultra Turrax homogeniser
 f) mortar and pestle grinding.

By application of liquid film-forming inks onto various substrates, coatings capable of distinct colour change can be produced. Exposure to near-IR sources can produce dramatically different results, dependent primarily on the formulation of the ink.

Due to the effectiveness of the invention in producing a black image on exposure to fibre, diode or diode array laser wavelengths, e.g. when including a non-stoichiometric compound and an oxymetal anion, this may be further exploited by differentiating between activating sources.

A composition of or for use in the invention can be used to produce an IR-sensitive coating that can be applied by a range of methods such as flood-coating, flexo/gravure etc. The coating can be applied to a range of substrates such as paper, paperboard, flexible plastic film, corrugate board etc.

Further media that may be used in the invention are UV-curable flexographic inks, UV-curable offset inks, conventional offset inks, melt-extrudable polymer and powder coatings.

The following Examples illustrate the invention.

AdNano® reduced-ITO 25% aqueous dispersion was supplied by Degussa Advanced Nano Materials.

PureNano reduced-ITO nanopowder was supplied at NanoProducts Corp, Longmont, Colo., USA. Average particle size=30.9 nm.

XMZL r-ITO nanopowder was supplied by Xiamen Zhongli Technology Co. Ltd., China Average particle size=40 nm.

Copper (II) hydroxy phosphate (CHP) powder was supplied by Sigma-Aldrich.

Reduced antimony tin oxide was supplied by Xiamen Zhongli Technology Co Ltd., China. Average particle size=60 nm.

EXAMPLE 1

A base aqueous ink was formulated as follows:

| | | |
|---|---|---|
| UH-5000 | 28.9 g | Scott Bader, acrylic PU binder. |
| E1 | 4.0 g | Ciba, glasswax. |
| Glascol LS-2 | 18.4 g | Ciba, modified acrylic aqueous emulsion. |
| Tyzor LA | 2.5 g | DuPont, lactic acid titanate adhesion promoter. |
| Dispelair CF-49 | 1.0 g | Blackburn Chemicals, defoamer |
| AOM | 44.7 g | Climax Molybdenum, colour change pigment |
| Aerosil 200 | 0.5 g | Degussa, fumed silica anti-settling agent. |

The above formulation was then Silverson mixed at 6000 rpm for 60 minutes.

Substrate=50 µm white PET film supplied by Hi-Fi (product code 125).

The above inks were applied to the PET substrate using an RK Printcoat Instruments K Control Coater using a 30M K-bar at a speed setting of 4. This resulted in coat weights of 8.1 to 9.9 $gm^{-2}$.

Marking was performed using a fibre laser operating at 1066 nm with a power output of approximately 4 W.

The laser was used to create a 1 $cm^2$ 'square' block black/grey image. Three squares were produced at each of the following fluence levels: 0, 2.156, 2.61, 2.844, 3.123, 3.546, 4.077, 4.856 $Jcm^{-2}$.

An average optical density of the images at each mark speed was then determined using a Macbeth® TR924 reflectance spectrophotometer.

(i) CHP at 8.3%

| | |
|---|---|
| Base ink | 1.0 g |
| CHP powder | 0.25 g |
| Water | 1.75 g |

(ii) CHP at 4.2%

| | |
|---|---|
| Base ink | 1.0 g |
| CHP powder | 0.125 g |
| Water | 0.1875 g |

(iii) r-ITO at 8.3%

| | |
|---|---|
| Base ink | 1.0 g |
| AdNano ® r-ITO aqueous dispersion | 1.0 g |
| Water | 1.0 g |

(iv) r-ITO at 4.2%

| | |
|---|---|
| Base ink | 1.0 g |
| AdNano ® r-ITO aqueous dispersion | 0.5 g |
| Water | 1.5 g |

The following results were obtained:

| Fluence | CHP 4.2% | r-ITO 4.2% | CHP 8.3% | r-ITO 8.3% |
|---|---|---|---|---|
| 0 | 0.04 | 0.05 | 0.03 | 0.06 |
| 2.156 | 0.05 | 0.05 | 0.11 | 0.51 |
| 2.61 | 0.06 | 0.07 | 0.19 | 0.78 |
| 2.844 | 0.07 | 0.08 | 0.36 | 1.03 |
| 3.123 | 0.09 | 0.19 | 0.67 | 1.18 |
| 3.546 | 0.11 | 0.67 | 0.99 | 1.16 |
| 4.077 | 0.2 | 1.18 | 1.1 | 1.04 |
| 4.856 | 0.26 | 1.23 | 1.01 | 0.94 |

These data clearly show that r-ITO was more efficacious than CHP per unit % applied.

EXAMPLE 2

The following ink formulations were made up:

(i)

| | |
|---|---|
| PureNano r-ITO powder | 5 g |
| AOM | 27.5 g |
| UH-5000 | 66.5 g |
| Octafoam E-235 (Octel; a defoamer) | 1.0 g |

(ii)

| | |
|---|---|
| CHP | 5 g |
| AOM | 27.5 g |
| UH-5000 | 66.5 g |
| Octafoam E-235 | 1.0 g |

(iii)

| | |
|---|---|
| CHP | 10.6 g |
| AOM | 27.5 g |
| UH-5000 | 61 g |
| Octafoam E-235 | 1.0 g |

(iv)

| | |
|---|---|
| CHP | 20 g |
| AOM | 27.5 g |
| UH-5000 | 51.5 g |
| Octafoam E-235 | 1.0 g |

The inks were milled using an Eiger-Torrance bead-mill, 50 ml capacity, operating at 4000 rpm for 15 minutes. The inks were drawn down on PET film as described above, to give a coat weight of $10\pm1.5$ gm$^{-2}$.

The following optical density results at 5% loading were obtained:

| Fluence | CHP 5% | r-ITO 5% |
|---|---|---|
| 0 | 0 | 0.04 |
| 2.156 | 0.01 | 0.03 |
| 2.61 | 0.01 | 0.03 |
| 2.844 | 0.01 | 0.06 |
| 3.123 | 0.013 | 0.07 |
| 3.546 | 0.013 | 0.14 |
| 4.077 | 0.02 | 0.61 |
| 4.856 | 0.03 | 0.94 |

These data clearly show the increased efficacy of r-ITO over CHP.

The optical density values were obtained at a fluence of 4.856 Jcm$^{-2}$ for CHP at 5, 10.6 and 20% loading and r-ITO at 5%, and these data were used to calculate the absorbance needed to get an optical density=1 and then ABS OD$^{-1}$% applied-1.

| | OD at 4.856 J/cm2 | Abs per OD | Abs per OD per % |
|---|---|---|---|
| 0 | 0 | 0 | 0 |
| ITO 5% 7.5 gsm | 1.1 | 0.35 | 0.07 |
| ITO 5% 9.5 gsm | 1.06 | 0.35 | 0.07 |
| CHP 5% 12.5 gsm | 0.05 | 6.8 | ∞ |
| CHP 10.6% 9.5 gsm | 0.78 | 0.38 | 0.035 |
| CHP 20% 11.5 gsm | 1.15 | 0.51 | 0.025 |

The lower Abs per OD value obtained for r-ITO demonstrates that the mechanism goes beyond NIR absorption and an additional, surprising effect has been obtained.

EXAMPLE 3

The following non-aqueous ink formulation was made up:

| | |
|---|---|
| Ethanol (Aldrich) | 211.8 g |
| Ethyl acetate (Aldrich) | 70.5 g |
| Pioloform BN-18 (Wacker) | 32.7 g |

-continued

| | |
|---|---|
| Nitrocellulose DCX 3-5 (Norwell Enterprises) | 9.3 g |
| Casothane (Thomas Swan & Co. Ltd) | 11.4 g |
| Dibutyl Sebacate (Aldrich) | 4.8 g |
| Vilosyn 339 (VIL Resins) | 5.4 g |
| Tyzor ZEC (DuPont) | 7.8 g |
| Crayvalla WS-4700 (Cray Valley) | 8.7 g |
| AOM | 142.5 g |

The formulation was made up using an overhead mechanical stirrer operating at 2000 rpm.

The above non-aqueous base formulation was milled with the inorganic compounds using the Eiger-Torrance 50 ml capacity bead mill for 15 minutes as follows:

(i)

| | |
|---|---|
| Non-aqueous base formulation | 65 g |
| CHP | 30 g |

(ii)

| | |
|---|---|
| Non-aqueous base formulation | 65 g |
| PureNano r-ITO powder | 30 g |

The inks were printed on to PET film as before:—
CHP coat weight=14.8 gsm
r-ITO coat weight=8.2 gsm

| Fluence | CHP | r-ITO |
|---|---|---|
| 0 | 0 | 0 |
| 0.711 | 0 | 0.02 |
| 0.8415 | 0 | 0.02 |
| 0.948 | 0 | 0.025 |
| 1.0425 | 0 | 0.1 |
| 1.182 | 0.01 | 0.27 |
| 1.359 | 0.01 | 0.56 |
| 1.5345 | 0.1 | 0.8 |
| 1.683 | 0.133 | 0.74 |
| 1.896 | 0.22 | 0.95 |
| 2.085 | 0.54 | 0.85 |
| 2.364 | 0.9 | 0.75 |
| 2.718 | 1.1 | 0.89 |
| 3.069 | 1.16 | 0.49 |

Above a fluence of 1.5345 $Jcm^{-2}$, the r-ITO prints were charred.

The Abs $OD^{-1}$ at a fluence of 1.5345 $Jcm^1$ was determined.

| | GSM | Abs | OD | Abs per OD |
|---|---|---|---|---|
| CHP | 14.8 | 0.9737 | 0.1 | 9.737 |
| r-ITO | 8.2 | 0.9941 | 0.8 | 1.242625 |

This experiment shows the effect of r-ITO in a non-aqueous ink. The CHP has almost double the coat weight and still cannot match the efficacy of r-ITO.

EXAMPLE 4

All the draw-downs prepared in Examples 1, 2 and 3 were irradiated with a 1550 nm diode laser, with a power output of 0.1 W. This laser was only capable of producing a 'scratch/mark' on to the substrate. No changes were observed for all ink formulations devoid of any NIR absorbers containing CHP. For all ink formulations containing r-ITO, a visibly noticeable scratch/mark could be seen.

EXAMPLE 5

This Example demonstrates that it is non-stoichiometric/reduced ITO that is required for NIR absorption in the region 780 to 2500 nm, rather than stoichiometric/normal ITO (s-ITO). Stoichiometric ITO is bright yellow compared to the grey/blue colour of reduced ITO.

(i) Ink Containing Normal/Stoichiometric ITO

| | |
|---|---|
| s-ITO powder (Aldrich) | 5.0 g |
| AOM | 29 g |
| Octafoam E-235 | 1.0 g |
| UH-5000 | 65 g |

(ii) Ink Containing Reduced/Non-Stoichiometric ITO

| | |
|---|---|
| XMZL r-ITO powder | 5.0 g |
| AOM | 29 g |
| Octafoam E-235 | 1.0 g |
| UH-5000 | 65 g |

The above inks were milled using an Eiger-Torrance bead-mill, 50 ml capacity, operating at 4000 rpm for 15 minutes. The inks were then drawn down on PET as described above at 10±1.5 $gm^{-2}$.

The samples were irradiated with the 1066 and 1550 nm lasers.

At 1066 nm:

| Fluence $Jcm^{-2}$ | s-ITO 5% | r-ITO 5% |
|---|---|---|
| 0 | 0 | 0 |
| 2.156 | 0.01 | 0.01 |
| 2.61 | 0.01 | 0.02 |
| 2.844 | 0.01 | 0.06 |
| 3.123 | 0.01 | 0.21 |
| 3.546 | 0.01 | 0.4 |
| 4.077 | 0.02 | 0.73 |
| 4.856 | 0.02 | 1.03 |

At 1550 nm:
S-ITO=No changes observed.
r-ITO=A visibly noticeable scratch/mark could be seen.

EXAMPLE 6

The ability of r-ITO to function as a NIR absorber in thermochromic ink formulations was demonstrated.

The following ink formulations were made up:

(i) Traditional NIR Absorber

| | |
|---|---|
| CHP | 10 g |
| UH-5000 | 90 g |

(ii) Non-stoichiometric NIR Absorber

| | |
|---|---|
| PureNano r-ITO powder | 10 g |
| UH-5000 | 90 g |

(iii) Colour Developer

| | |
|---|---|
| Nipabenzyl BHB (Nipa Laboratories Ltd) | 20 g |
| UH-5000 | 80 g |

(iv) Colour Former

| | |
|---|---|
| Pergascript Red I6B (CibaSC) | 10 g |
| UH-5000 | 90 g |

(v) Colour Former

| | |
|---|---|
| Pergascript Blue I2RN (CibaSC) | 10 g |
| UH-5000 | 90 g |

(vi) Colour Former

| | |
|---|---|
| Pergascript Black IR (CibaSC) | 10 g |
| UH-5000 | 90 g |

The above inks were milled using an Eiger-Torrance bead-mill, 50 ml capacity, operating at 4000 rpm for 15 minutes. They were then mixed as follows:

a. CHP with each colour former ink at a 1:1 ratio.
b. r-ITO with each colour former ink at a 1:1 ratio.
c. CHP with the colour developer and each colour former ink at a ratio of 1:1:1.
d. r-ITO with the colour developer and each colour former ink at a ratio of 1:1:1.

Each ink formulation was then drawn down on PET film as described above. Coat weights of $8.0 \pm 2.0$ $gm^{-2}$ were achieved.

The prints were irradiated with a 1066 nm fibre laser operating at 4.8 W. The average optical density of three 1 $cm^2$ images was obtained and plots of fluence ($Jcm^{-2}$) versus optical density were obtained. The results are given in the tables below:

NIR Absorber and Colour Former at 1:1

| Fluence $Jcm^{-2}$ | CHP:Red | CHP:Blue | CHP:Black | r-ITO:Red | r-ITO:Blue | r-ITO:Black |
|---|---|---|---|---|---|---|
| 0 | 0 | 0 | 0 | 0 | 0 | 0 |
| 2.156 | 0.016 | 0.01 | 0.01 | 0.01 | 0.01 | 0.107 |
| 2.61 | 0.03 | 0.01 | 0.02 | 0.02 | 0.017 | 0.167 |
| 2.844 | 0.036 | 0.01 | 0.02 | 0.03 | 0.01 | 0.197 |
| 3.123 | 0.05 | 0.01 | 0.027 | 0.047 | 0.027 | 0.217 |
| 3.546 | 0.055 | 0.02 | 0.047 | 0.08 | 0.05 | 0.23 |
| 4.077 | 0.065 | 0.02 | 0.103 | 0.16 | 0.06 | 0.217 |
| 4.856 | 0.077 | 0.03 | 0.145 | 0.19 | 0.037 | 0.21 |

NIR Absorber, Colour Developer and Colour Former at 1:1:1.

| Fluence $Jcm^{-2}$ | CHP:Red | CHP:Blue | CHP:Black | r-ITO:Red | r-ITO:Blue | r-ITO:Black |
|---|---|---|---|---|---|---|
| 0 | 0 | 0 | 0 | 0 | 0 | 0 |
| 2.156 | 0.01 | 0.01 | 0.01 | 0.057 | 0.01 | 0.04 |
| 2.61 | 0.01 | 0.01 | 0.023 | 0.07 | 0.02 | 0.077 |
| 2.844 | 0.017 | 0.01 | 0.01 | 0.09 | 0.027 | 0.1 |
| 3.123 | 0.02 | 0.01 | 0.027 | 0.11 | 0.027 | 0.16 |
| 3.546 | 0.053 | 0.01 | 0.03 | 0.127 | 0.027 | 0.14 |
| 4.077 | 0.09 | 0.02 | 0.03 | 0.17 | 0.037 | 0.24 |
| 4.856 | 0.107 | 0.02 | 0.03 | 0.19 | 0.503 | 0.31 |

The ability of r-ITO to function as an NIR absorber with more efficacy than CHP in thermochromic ink applications is demonstrated by the above results.

EXAMPLE 7

The following aqueous formulations were made up:

(i)

| | |
|---|---|
| r-ATO | 5 g |
| AOM | 35 g |
| UH-5000 | 59 g |
| Octafoam E235 | 1 g |

(ii)

| | |
|---|---|
| r-ITO | 5 g |
| AOM | 35 g |
| UH-5000 | 59 g |
| Octafoam E235 | 1 g |

The inks were milled for 15 minutes using an Eiger-Torrance 50 ml bead mill and then drawn down on to PET film. The draw-downs were imaged using a 1550 nm fiber laser operating with a power output of 200 milliwatts. Both the r-ATO and r-ITO based draw-downs produced contrasting black images where the laser radiation had contacted the draw-down surface.

The invention claimed is:

1. An ink formulation comprising a marking component and a non-stoichiometric metal salt, wherein the marking component in the absence of the metal salt undergoes a colour change in response to laser irradiation at a wavelength above 2500 nm but not between 780-2500 nm, and the metal salt absorbs laser radiation at 780-2500 nm, thereby causing the marking component to change colour.

2. The formulation according to claim 1, wherein the metal salt has excess metal.

3. The formulation according to claim 1, wherein the metal salt has a metal deficiency.

4. The formulation according to claim 2, wherein the metal salt compound is an oxide, mixed oxide, nitride or boride.

5. The formulation according to claim 4, wherein the compound is antimony tin oxide, indium tin oxide, aluminum zinc oxide or indium zinc oxide.

6. The formulation according to claim 5, wherein the non-stoichiometric compound mixed metal oxide is in a reduced form.

7. The formulation according to claim 6, wherein the compound is reduced indium tin oxide.

8. The formulation according to claim 1, which additionally comprises a colour-forming compound.

9. The formulation according to claim 1, wherein the non-stoichiometric compound is present in the form of particles with an D3,2 average particle size in the range from 10 nm to 10 μm.

10. The formulation according to claim 9, wherein the size is less than 1 μm.

11. The formulation according to claim 10, wherein the size is less than 100 nm.

12. The formulation according to claim 1, wherein the marking component is a compound including an oxymetal anion.

13. The formulation according to claim 12, wherein the marking component is a molybdate.

14. The formulation according to claim 12, wherein the marking component is an octamolybdate.

15. The formulation according to claim 12, wherein the marking component is ammonium octamolybdate.

16. The formulation according to claim 1, which additionally comprises a binder.

17. The formulation according to claim 1, which is water-based.

18. The formulation according to claim 1, which comprises an organic solvent.

19. A substrate coated with a formulation according to claim 1.

20. The substrate according to claim 19, including a marking component and coated with a non-stoichiometric compound, wherein the marking component undergoes a colour change in response to laser irradiation at a wavelength above 2500 nm but not between 780-2500 nm, and the compound absorbs laser radiation at 780-2500 nm, thereby causing the marking component to change colour.

21. The substrate according to claim 19, which is paper, cardboard, plastic, textile, wood, metal, glass, leather, a foodstuff or a pharmaceutical composition.

22. A method of applying an inorganic non-stoichiometric compound on to a substrate that comprises a marking component, wherein the marking component undergoes a colour change in response to laser irradiation at a wavelength above 2500 nm but not between 780-2500 nm, and the compound absorbs laser radiation at 780-2500 nm, thereby causing the marking component to change colour; and wherein said method comprises using a sputtering process.

23. A method for forming an image on a substrate, which comprises irradiating with a laser substrate coated with a formulation according to claim 1.

24. The method according to claim 23, wherein the laser is a fibre, diode, diode array or $CO_2$ laser.

25. The method according to claim 24, wherein the laser has an operating wavelength in the range 780 to 2500 nm.

* * * * *